United States Patent [19]

Noso et al.

[11] Patent Number: 4,597,098
[45] Date of Patent: Jun. 24, 1986

[54] SPEECH RECOGNITION SYSTEM IN A VARIABLE NOISE ENVIRONMENT

[75] Inventors: Kazunori Noso, Yokosuka; Norimasa Kishi, Yokohama, both of Japan

[73] Assignee: Nissan Motor Company, Limited, Japan

[21] Appl. No.: 767,674

[22] Filed: Aug. 21, 1985

Related U.S. Application Data

[63] Continuation of Ser. No. 408,705, Aug. 16, 1982, abandoned.

[30] Foreign Application Priority Data

Sep. 25, 1981 [JP] Japan ............... 56-150730

[51] Int. Cl.$^4$ ............................................. G10L 1/00
[52] U.S. Cl. ..................................................... 381/46
[58] Field of Search ........................... 381/41–43, 381/46, 86, 110

[56] References Cited

U.S. PATENT DOCUMENTS

| 4,027,102 | 5/1977 | Ando et al. ............... 381/46 |
| 4,028,496 | 6/1977 | LaMarche et al. ......... 381/46 |
| 4,087,630 | 5/1978 | Browning et al. . | |
| 4,100,370 | 7/1978 | Suzuki et al. . | |
| 4,158,750 | 6/1979 | Sakoe et al. . | |
| 4,296,277 | 10/1981 | Daneffel ................. 381/46 |
| 4,331,837 | 5/1982 | Soumagne ............... 381/46 |
| 4,351,983 | 9/1982 | Crouse et al. . | |
| 4,359,604 | 11/1982 | DuMont .................. 381/46 |

FOREIGN PATENT DOCUMENTS 916781  1/1963  United Kingdom .

OTHER PUBLICATIONS

D. Raj Reddy, "Speech Recognition by Machine: A Review", Proceedings of the IEEE, vol. 64, No. 4, Apr. 1976.
S. L. Dunik, "Phoneme Recognizer Using Formant Ratios", IBM Technical Disclosure Bulletin, vol. 22, No. 11, Apr. 1980.

Primary Examiner—E. S. Matt Kemeny
Attorney, Agent, or Firm—Lowe, Price, Leblanc, Becker & Shur

[57] ABSTRACT

A speech recognition system for an automotive vehicle derive a spoken instruction start signal and a spoken instruction end signal when a smoothed spoken instruction signal exceeds or drops below a predetermined threshold level representing the intensity of the background noise for more than first and second predetermined time periods, respectively. Noise is determined by converting the output of a microphone transducing the spoken instruction into a single polarity signal that is smoothed with a long time constant. The single polarity variation is also smoothed with a shorter time constant. The signals with the long and short constants are applied to a comparator that derives a bi-level output signal. In response to transitions in first and second directions of the bi-level signal lasting for first and second durations, the start and end signals are respectively derived.

17 Claims, 16 Drawing Figures

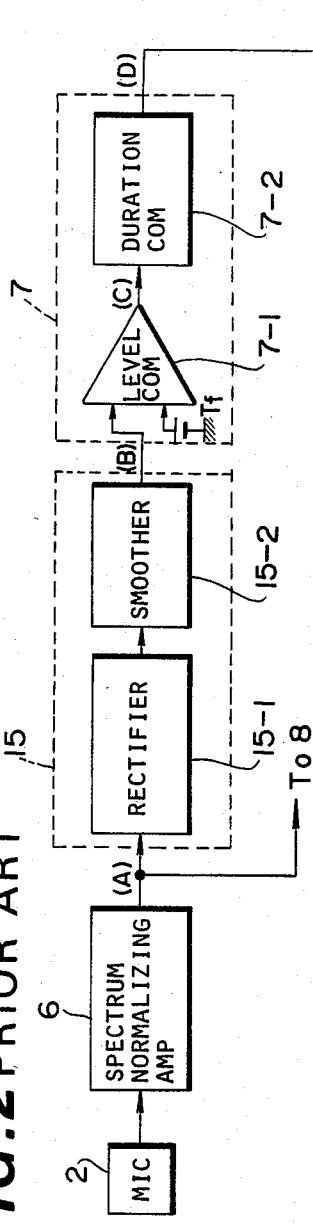
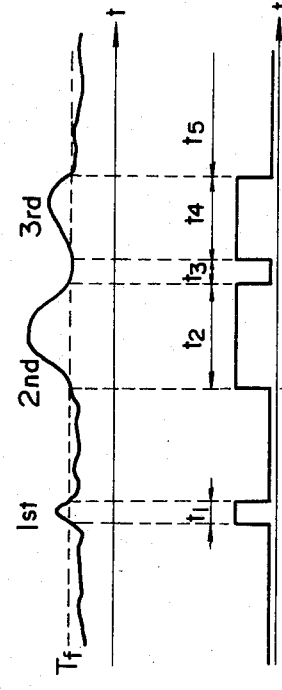
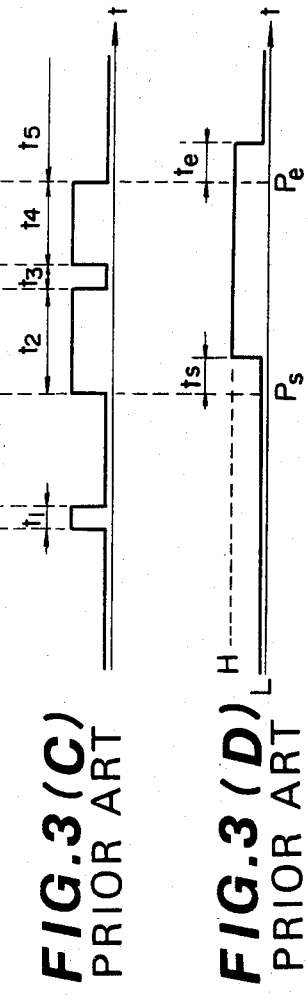
FIG.2 PRIOR ART
FIG.3(A) PRIOR ART
FIG.3(B) PRIOR ART
FIG.3(C) PRIOR ART
FIG.3(D) PRIOR ART

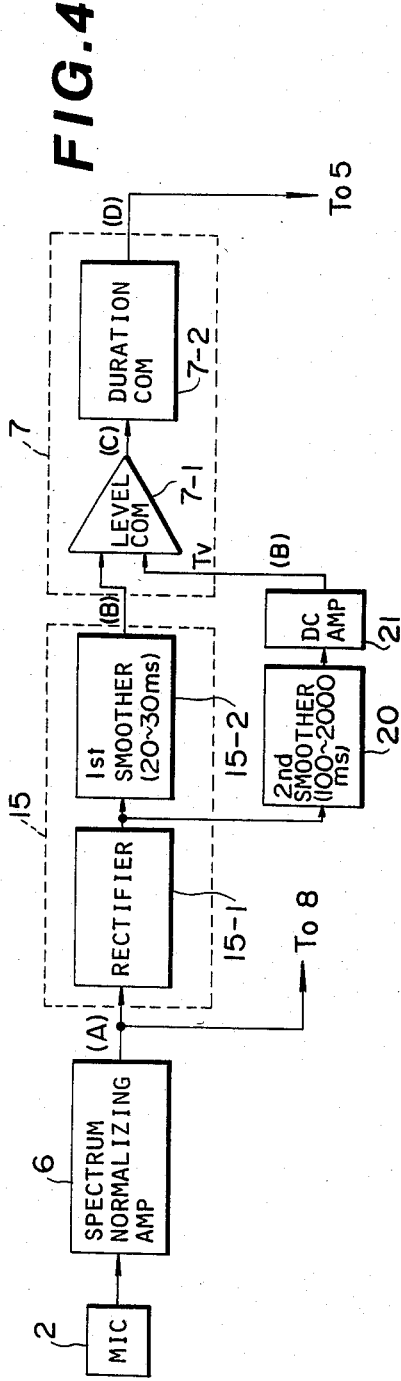
FIG.4
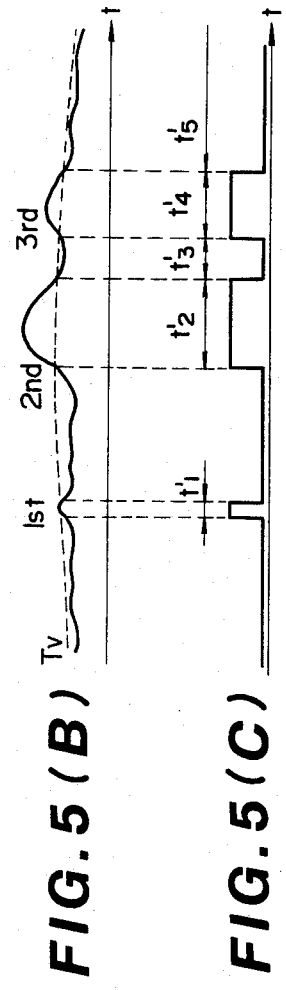
FIG.5(A)
FIG.5(B)
FIG.5(C)
FIG.5(D)

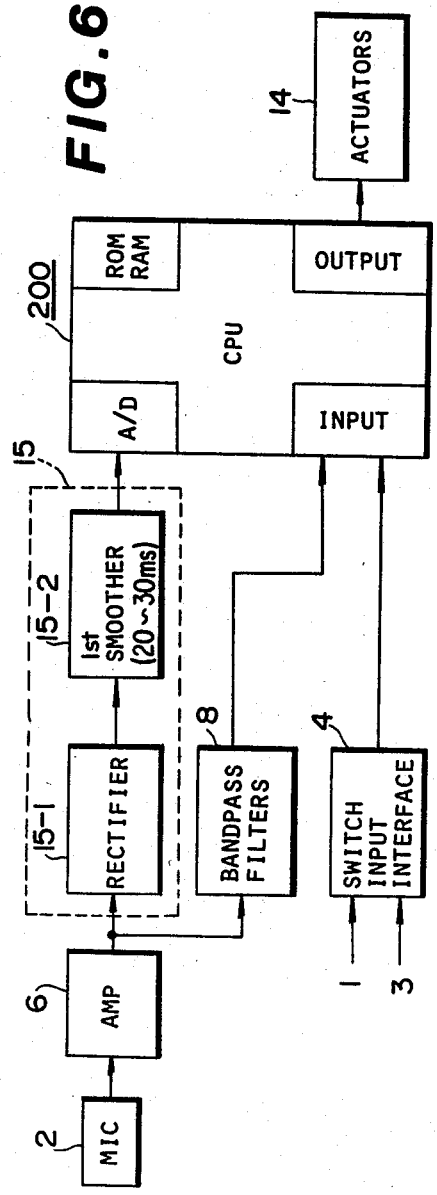
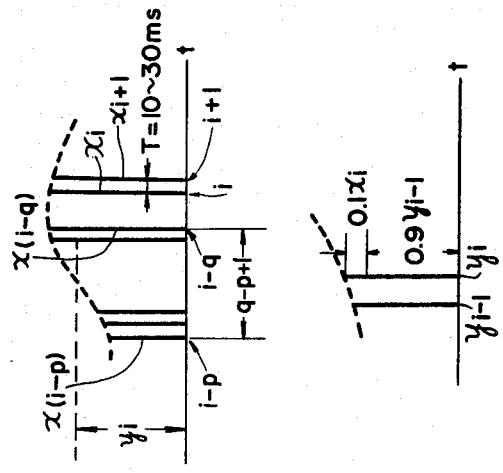

SPEECH RECOGNITION SYSTEM IN A VARIABLE NOISE ENVIRONMENT

This application is a continuation, of application Ser. No. 408,705, filed Aug. 16, 1982, now abandoned.

BACKGROUND OF THE INVENTION

1. Field of the Invention

The present invention relates generally to a speech recognition system for an automotive vehicle, and more particularly to a speech recognition system by which a driver's spoken instructions can be reliably recognized even as engine noise fluctuates within the passenger compartment.

2. Description of the Prior Art

There is a well-known speech recognizer which can activate various actuators in response to human spoken instructions. When this speech recognizer is mounted on a vehicle, the headlight, for instance, can be turned on or off in response to spoken instructions such as "Headlight on" or "Headlight off". Such a speech recognizer usually can recognize various spoken instructions in order to control various actuators; however, there are some problems involved in applying this system to an automotive vehicle.

Usually, the speech recognizer is used in a relatively quiet environment; however, the speech recognition system for an automotive vehicle is usually used within a relatively noisy passenger compartment subject large variations in noise level. Therefore, one of the major problems is how to cope with erroneous spoken phrase recognitions caused by fluctuating background, particularly engine, noise within the passenger compartment.

In order to distinguish a spoken instruction from noise, a voice detector is usually provided in the speech recognizer. The start and the end of a spoken instruction are respectively determined by detecting whether the magnitude of a spoken instruction signal exceeds and drops below a predetermined fixed reference threshold voltage level for first and second predetermined time periods. A high noise level causes the fixed reference threshold voltage level to be exceeded for a long time. Hence, the voice detector is likely to erroneously consider this state to represent the beginning of a spoken instruction. In other words, the prior-art speech recognizer is prone to erroneous recognition due to intense noise within the passenger compartment.

A more detailed description of a typical prior-art speech recognizer will be made with reference to the attached drawings in conjunction with the present invention under DETAILED DESCRIPTION OF THE PREFERRED EMBODIMENTS.

SUMMARY OF THE INVENTION

With these problems in mind therefore, it is the primary object of the present invention to provide a speech recognition system for an automotive vehicle which can reliably detect the start and end of a spoken instruction even though the noise level is high and fluctuates violently within the passenger compartment of an automotive vehicle, that is, which can reliably prevent erroneous recognition of spoken instructions even with noise within the passenger compartment.

To achieve the above-mentioned object, the speech recognition system for an automotive vehicle according to the present invention comprises a voice detecting means for deriving a speech instruction start signal when a spoken instruction signal including ambient noise exceeds a variable reference threshold voltage level for more than a first predetermined period of time. The threshold level changes according to the level of ambient noise. A speech instruction end signal is derived when the spoken instruction signal including noise drops below the variable reference threshold voltage level for more than a second predetermined period of time.

The voice detecting means according to the present invention includes a conventional first smoother having a time constant between 20 to 30 ms. In addition the voice detector comprises a second smoother having a time constant between about 100 to 2000 ms and a DC amplifier having a gain of from one to four. The voice detector contains a voltage level comparator and a pulse duration comparator, which are all included in an RMS smoother, and a voice detector of the typical speech recognizer.

If a microcomputer is used for this system, the voice detecting means can be incorporated within the microcomputer. The microcomputer can perform arithmetic operations executed in accordance with an appropriate software to achieve the same operations as the second smoother circuit.

BRIEF DESCRIPTION OF THE DRAWINGS

The features and advantages of the speech recognition system for an automotive vehicle according to the present invention will be more clearly appreciated from the following description taken in conjunction with the accompanying drawings in which like reference numerals designate corresponding elements or sections throughout the drawings and in which;

FIG. 2 is a schematic block diagram of a detailed portion of the voice detecting means of the prior-art speech recognizer shown in FIG. 1;

FIG. 3(A) is a graphical representation of the waveforms of a spoken instruction signal including noise as measured at point (A) in FIG. 2;

FIG. 3(B) is a graphical representation of the waveforms of the spoken instruction signal including noise and a reference threshold voltage level as measured at point (B) in FIG. 2;

FIG. 3(C) is a graphical representation of the waveform of the spoken instruction pulse signal as measured at point (C) in FIG. 2;

FIG. 3(D) is a graphical representation of the waveform of the spoken instruction start/end signal as measured at point (D) in FIG. 2;

FIG. 4 is a schematic block diagram of an essential portion of a first embodiment of a voice detecting means of the speech recognition system for an automotive vehicle according to the present invention;

FIG. 5(A) is a graphical representation of the waveforms of a spoken instruction signal including noise as measured at point (A) in FIG. 4;

FIG. 5(B) is a graphical representation of the waveforms of the spoken instruction signal including noise and a variable reference threshold voltage level as measured at point (B) in FIG. 4;

FIG. 5(C) is a graphical representation of the waveform of the spoken instruction pulse signal as measured at point (C) in FIG. 4;

FIG. 5(D) is a graphical representation of the waveform of the spoken instruction start/end signal as measured at point (D) in FIG. 4;

FIG. 6 is a schematic block diagram of a second embodiment of a voice detecting means of the speech recognition system for an automotive vehicle according to the present invention, in which a microcomputer is used;

FIG. 8 is a graphical representation for assistance in explaining an exemplary method of smoothing a signal on the basis of arithmetic operations;

DETAILED DESCRIPTION OF THE PREFERRED EMBODIMENTS

Figure 1:
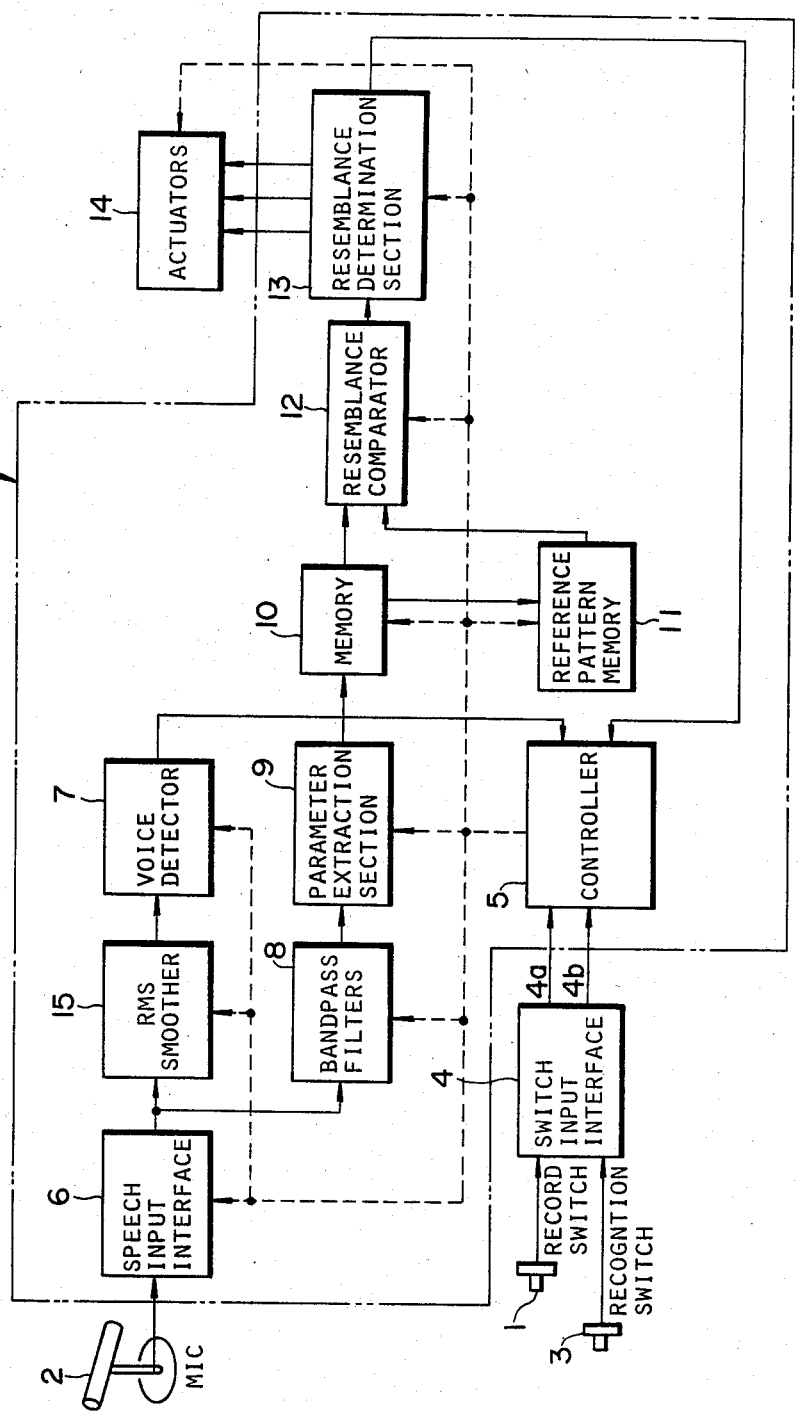
FIG. 1 is a schematic block diagram of a typical prior-art speech recognizer for assistance in explaining the operations of the present invention.

To facilitate understanding of the present invention, brief reference is made to the principle or operation of a typical prior-art speech recognizer, with reference to FIG. 1.

FIG. 1 is a schematic block diagram of a typical speech recognizer 100. To use the speech recognizer, the user must first record a plurality of predetermined spoken instructions. Specifically, in a spoken instruction recording mode (reference mode), the user first depresses a record switch 1 disposed near the user. When the record switch 1 is depressed, a switch input interface 4 detects the depression of the record switch 2 and supplies a signal to a controller 5 via a wire 4a. In response to this signal, the controller 5 supplies a recording mode command signal to other sections in order to preset the entire speech recognizer to the recording mode. In the spoken instruction recording mode, when the user says a phrase to be used as a spoken instruction, such as "open doors", near a microphone 2, the spoken phrase is transduced into a corresponding electric signal through the microphone 2, amplified through a speech input interface 6 including mainly a spectrum-normalizing amplifier; the output of interface 6 is smoothed by a root-mean-square (RMS) smoother 15 including a rectifier and a smoother, and finally coupled to a voice detector 7.

The spectrum-normalizing amplifier in interface 6, described in detail in an accompanying U.S. patent application of the same applicants, amplifies the signal transduced by microphone 2 so different gain levels are applied to different frequencies. The amplitude vs. frequenc response of the amplifier adjusts the naturally frequency-dependent power spectrum of human speech to a more nearly flat power spectrum. Voice detector 7 detects whether or not the magnitude of the spoken phrase signal exceeds a predetermind level for a predetermined period of time (150 to 250 ms) in order to recognize the start of the spoken phrase input signal. Detector 7 determines whether or not the signal magnitude drops below a predetermined level for a predetermined period of time (about 300 ms) in order to recognize the end of the signal. Upon detection of the start of the signal, this voice detector 7 supplies another recording mode command signal to the controller 5. In response to this command signal, the controller 5 activates a group of bandpass filters 8, so that the spoken phrase signal from the microphone 2 is divided into a number of predetermined frequency bands. In parameter extraction section 9, the frequency-divided spoken phrase signals derived from filters 8 are squared or rectified to derive the voice power spectrum across the frequency bands; the power spectrum is then converted into corresponding digital time-series matrix-phonetic pattern data (explained later). These data are then stored in a memory unit 10. In this case, however, since the speech recognizer is set to the spoken instruction recording mode by the depression of the record switch 1, the time-series matrix-phonetic pattern data are transferred to a reference pattern memory unit 11 and stored therein as reference data for use in recognizing the speech instructions.

After having recorded the reference spoken instructions, the user can uter speech instructions, such as "open doors", which are recognized by comparison with signals stored in memory 10 while record switch 1 is activated. The speech instructions are supplied to the speech recognizer through the microphone 2 while recognition switch 3 is depressed.

Switch input interface 4 detects the depression of the recognition switch 3 and supplies a signal to the controller 5 via a wire 4b. In response to this signal, the controller 5 supplies a recognition mode command signal to other sections to preset the entire speech recognizer to the recognition mode. In this spoken phrase recognition mode, when the user says an instruction phrase similar to the one recorded previously near the microphone 2 and when the voice detector 7 derives a signal, the spoken instruction is transduced into a corresponding electric signal through the microphone 2, amplified through the speech input interface 6, filtered and divided into voice power spectra across the frequency bands through the band pass filters 8, squared or rectified and further converted into corresponding digital time-series matrix-phonetic pattern data through the parameter extraction section 9, and then stored in the memory unit 10, in the same manner as in the recording mode.

Next, the time-series matrix-phonetic pattern data stored in the memory unit 10 in the recognition mode are sequentially compared with the time-series matrix-phonetic pattern data stored in the reference pattern memory unit 11 in the recording mode by a resemblance comparator 12. The resemblance comparator 12 calculates the level of correlation of the speech instruction supplied to the reference speech instruction after time normalization and level normalization to compensate for variable speaking rate (because the same person might speak quickly and loudly at one time but slowly and in a whisper at some other time). The correlation factor is usually obtained by calculating the Tchebycheff distance (explained later) between recognition-mode time-series matrix-phonetic pattern data and recording-mode time-series matrix-phonetic pattern data. A signal indicative of the correlation factor calculated by the resemblance comparator 12 is coupled to a resemblance determination section 13 to determine whether or not the calculated values lie within a predetermined range, that is, to evaluate the cross-correlation of the calculated value. If within the range, a command signal, indicating that a recognition-mode spoken instruction having adequate resemblance to one of the recorded instruction phrases, is supplied to one of actuators 14 that corresponds with the correlation, e.g., to open the vehicle doors. The above-mentioned operations are all executed in accordance with command signals derived from the controller 5.

Description has been made hereinabove of the case where the speech recognizer 100 comprises various discrete elements or sections; however, it is of course possible to embody the speech recognizer 100 with a microcomputer including a central processing unit, a read-only memory, a random-access memory, a clock oscillator, et cetera. In this case, the voice detector 7, the parameter extraction section 9, the memory 10, the reference pattern memory 11, the resemblance comparator 12 and the resemblance determination section 13 can all be incorporated within the microcomputer, executing the same or similar processes, calculations and/or operations as explained hereinabove.

The digital time-series matrix-phonetic pattern data and the Tchebycheff distance are defined as follows:

In the case where the number of the bandpass filters is four and the number of time-series increments for each is 32, the digital recording-mode time-series matrix-phonetic pattern data can be expressed as $$F(A) = f(i,j) = \begin{matrix} f(1,1), f(1,2), f(1,3) \ldots, f(1,32) \\ f(2,1), f(2,2), f(2,3) \ldots, f(2,32) \\ f(3,1), f(3,2), f(3,3) \ldots, f(3,32) \\ f(4,1), f(4,2), f(4,3) \ldots, f(4,32) \end{matrix}$$

where A designates a first recording-mode speech instruction (reference) (e.g. OPEN DOORS), i denotes the filter index, and j denotes time-series increment index.

If a first recognition-mode speech instruction (e.g. OPEN DOORS) is denoted by the character "B", the Tchebycheff distance can be obtained from the following expression:

$$l = |F(A) - F(B)| = \sum_{i=1}^{4} \sum_{j=1}^{32} |f^A(i,j) - f^B(i,j)|$$

FIG. 2 is a more detailed diagram of the speech detection section of the voice detecting means of the prior-art speech recognizer shown in FIG. 1, which is closely relevant to the present invention.

In FIG. 2, a spoken phrase transduced via a microphone 2 into a corresponding electric signal first passes through the speech input interface 6. The interface 6 is mainly made up of a spectrum-normalizing amplifier which amplifies the high frequencies of the electric signal to a greater degree than the low frequencies. This is because speech sounds tend to be attenuated greatly in the higher frequency range. An exemplary waveform of the spoken instruction signal including noise, as derived from the spectrum-normalizing amplifier 6, is shown in FIG. 3(A).

The amplified spoken instruction signal is next applied to the bandpass filters 8 to begin the process of recognizing whether the signal is a correctly spoken instruction and to the RMS smoother 15, mainly including rectifier 15-1 and a smoother 15-2; this begins the process of detecting the beginning and end of the spoken phrase. The waveform of FIG. 3(A) after having been rectified and smoothed has the waveform in FIG. 3(B), where $T_f$ denotes a reference threshold voltage level.

The smoothed signal is then coupled to the voice detector 7 including a voltage level comparator 7-1 and a pulse duration comparator 7-2. The voltage level comparator 7-1 compares the voltage level of the smoothed signal with the predetermined reference threshold voltage level $T_f$ and derives a H-voltage level pulse signal only while the voltage level of the speech instruction signal of FIG. 3(B) exceeds the reference threshold level $T_f$, as depicted in FIG. 3(C).

The pulse duration comparator 7-2 compares the pulse width of the H-voltage level pulse signal of FIG. 3(C) with a predetermined reference spoken instruction start time $t_s$ and another predetermined reference end time $t_e$ and derives a H-voltage level signal only when the pulse width of the pulse signal exceeds the reference start time $t_s$ and a L-voltage level signal when the pulse width of the pulse signal exceeds the reference end time $t_e$.

To explain in more detail with reference to FIGS. 3(C) and (D), if the pulse width of the first H-voltage level pulse signal has a time duration or width $t_1$ that is shorter than the reference start time $t_s$, the no H-voltage level signal is derived by pulse duration comparator 7-2. On the other hand, if the pulse width of the second H-voltage level pulse signal has a width $t_2$, that is longer than the reference start time $t_s$, the pulse duration comparator 7-2 derives a H-voltage level signal, indicating the start of a spoken instruction. In this case, the H-voltage level start signal from the pulse duration comparator 7-2 is delayed by the reference start time $t_s$ after the actual start time $P_s$ of the spoken instruction. Thereafter, this H-voltage level start signal is derived until the duration comparator 7-2 detects the end of speech instruction.

Next, when the H-voltage level pulse signal $t_2$ changes to a L-voltage level for a period of time $t_3$ that is shorter than the reference end time $t_e$, the pulse duration comparator 7-2 sustains the H-voltage level signal and does not indicate that the speech instruction has ended.

If a third pulse signal having a pulse width $t_4$ is derived again by level comparator 7-1 while the level comparator is at the H-level, the operation of the time comparator 7-2 is not affected.

Next, when the H-voltage level pulse signal $t_4$ changes to a L-voltage level for a period of time $t_5$ that is longer than the reference end time $t_e$, the pulse duration comparator 7-2 derives a L-voltage level signal, indicating the end of speech instruction. In this case, the L-voltage level end signal derived by duration comparator 7-2 is delayed by the reference end time $t_e$ after the actual end time $P_e$ of speech instruction. Thereafter, duration comparator 7-2 derives the end signal until it detects the start of another speech instruction.

In response to the H-voltage level signal from the duration comparator 7-2 as shown in FIG. 3(D), the controller 5 derives a command signal to activate a group of bandpass filters 8 and other sections of the system to enable them to recognize the spoken instruction signal derived from the spectrum-normalizing amplifier 6.

Since the reference threshold level in the voltage level comparator 7-1 of the prior art described system is fixed at a predetermined level, the speech recognizer cannot adequately cope with the noise level fluctuations within the passenger compartment. Thereby accurate detection of speech instruction start and end is compromised so that noise may be interpreted as attempts at speech and/or spoken instructions may be ignored.

In view of the above description and with reference to the attached drawings, the embodiments of the voice detecting means of the speech recognition system for an automotive vehicle according to the present invention are described hereinbelow.

In brief summation of this embodiment, the reference threshold level of the voltage level comparator 7-1 varies according to the level of noise in the spoken instruction signal derived from the spectrum-normalizing amplifier 6, thus improving the reliability of detecting speech instruction start and end.

FIG. 4 is a circuit diagram of a first embodiment of a voice detecting means of the speech recognition system according to the present invention.

The FIG. 4 system includes speech input interface 6 mainly including a spectrum-normalizing amplifier for amplifying spoken instruction signals, including noise, in the previously-described frequency-dependent manner. The output of amplifier 6 drives a root-mean-square (RMS) smoother 15 including a rectifier 15-1 and a first smoother 15-2 having a time constant from 20 to 30 milliseconds. The output of smoother 15-2 is coupled to voice detector 7, including a voltage level comparator 7-1 that drives duration comparator 7-2. Level comparator 7-1 compares the voltage level of the amplified and rectified spoken instruction signal with a variable reference threshold voltage level. Pulse duration comparator 7-2 compares the pulse duration of the H-voltage level or L-voltage level signal derived by voltage level comparator 7-1 with predetermined reference spoken instruction start and end times, respectively. Second smoother 20, having a time-constant from 100 to 2000 ms smoothes the spoken instruction signal, including noise, derived from rectifier 15-1. The output of smoother 20, indicative of the noise level of the output of amplifier 6, independent of the signal level, is applied to DC amplifier 21 for amplifying the smoothed signals by a gain factor of about one to four. The resulting variable reference threshold level TV, derived from amplifier 21, is applied to the voltage level comparator 7-1.

The operation of the voice detecting means of the speech recognition system according to the present invention is now described. A spoken phrase instruction, including noise, transduced by microphone 2 into a corresponding electrical signal is amplified by spectrum-normalizing amplifier 6 which adjust the microphone signal so it has an approximately balanced amplitude through the audio frequency range. The amplified spoken instruction signal including noise is applied in parallel to the bandpass filters 8 which initiate the time/power spectrum analysis and to the RMS smoother 15 which initiates the speech start and end detection process by smoothing the signal. The smoothed signal is applied to the voice detector 7 including the voltage level comparator 7-1 and the pulse duration comparator 7-2 for use in detecting the start and end of speech instruction.

The amplified and rectified spoken instruction signal including noise, as derived from rectifier 15-1, is applied to the second smoother 20 (time constant of about 100 to 2000 ms) which drives DC amplifier 21 (gain of about one to four) to obtain a variable reference threshold voltage level $T_V$ which is applied to the voltage level comparator 7-1. Therefore, the level comparator 7-1 compares the voltage level of the spoken instruction signal including noise from the first smoother 15-2 with the variable reference threshold voltage level from the DC amplifier 21, and outputs a H-voltage level pulse signal only which the voltage level of the signal from the first smoother 15-2 exceeds the variable reference threshold voltage level $T_V$ outputted from the amplifier 21. The duration comparator 7-2 compares each of the pulse widths of the H-voltage level pulse signals (H-voltage level duration) with a reference speech instruction start duration $t_s$ (e.g. 150 ms) and a reference speech instruction end duration te (e.g. 300 ms). Comparator 7-2 derives a H-voltage level signal only when the pulse width of the H-voltage level pulse signal exceeds the reference speech instruction start duration $t_s'$; comparator 7-2 derives a L-voltage level signal when the pulse width of the L-voltage level pulse signal exceeds the reference speech instruction end duration $t_e'$. These operations will be explained in more detail with reference to the graphical representation of the waveforms shown in FIGS. 5(A), (B), (C) and (D).

FIG. 5(A) is an exemplary waveform of a spoken phrase instruction signal including noise as derived from the spectrum-normalizing amplifier 6.

FIG. 5(B) includesa first waveform, represented by a solid line, of the spoken instruction signal, as rectified and smoothed via the rectifier 15-1 and the first smoother 15-2, and a second waveform, represented by a dashed line, of the noise signal $T_V$ as rectified, smoothed and amplified via the rectifier 15-1, the second smoother 20 and the amplifier 21.

In this embodiment, since the time constant of the first smoother 15-2 is 20 to 30 ms and that of the second smoother is 100 to 2000 ms, the above-mentioned reference threshold voltage level $T_V$ from the second smoother 20 changes gradually according to the variation in voltage level of the speech instruction signal including noise inputted via the microphone 2; the spoken instruction signal from the first smoother 15-2 generally changes more abruptly than threshold voltage level $T_V$. In other words, the threshold level $T_V$ is a mean value of the background noise level included in the spoken instruction signal. The higher the background noise level at the time of the spoken instruction, the higher the threshold level $T_V$, and vice versa. The threshold level $T_V$ varies according to the level of the spoken instruction signal; however, since the duration of spoken phrase instruction is relatively short (about one second or so), it is possible to minimize the influence of the spoken instruction level on the threshold level $T_V$ by choosing the time constant of the second smoother 20 to be sufficiently large.

FIG. 5(C) is a wave diagram of the H-voltage level pulse signals from the voltage level comparator 7-1. Assume that the pulse width of the first pulse signal is $t_1'$, a period shorter than the reference speech instruction start duration $t_s'$. In response to the first pulse signal the duration comparator 7-2 stays at the H-voltage level signal. On the other hand, if the pulse width of the second pulse signal is $t_2'$, longer than the reference speech instruction start duration $t_s'$, the duration comparator 7-2 derives a H-voltage level signal, indicating the start of a spoken phrase. In this case, the H-voltage level speech instruction start signal from the duration comparator 7-2 is delayed by the reference speech instruction start time $t_s'$ after the actual speech instruction start time $P_s'$, as depicted in FIG. 5(D). Thereafter, this H-voltage level start signal is derived from the duration comparator 7-2 until the comparator 7-2 detects the end of the spoken phrase.

Next, assume that the H-voltage level pulse signal $t_2'$ changes to a L-voltage level for a period of time $t_3'$, that is shorter than the reference speech instruction end duration $t_e'$. In this case the duration comparator 7-2 sustains the H-voltage level signal and does not change to the L-voltage level signal. If a third pulse signal having a pulse width $t_4'$ is derived again from the level comparator 7-1 while duration comparator 7-2 is still deriving a H-voltage level signal, the operation of the duration comparator 7-2 is not affected.

When the H-voltage level pulse signal $t_4'$ changes to a L-voltage level for a period of time $t_5'$ that is longer than the reference speech instruction end duration $t_e'$, the duration comparator 7-2 derives a L-voltage level signal, indicating the end of the spoken phrase. In this case, the L-voltage level speech instruction end signal from the duration comparator 7-2 is delayed by the reference speech instruction end time $t_e'$ after the actual speech instruction end $P_e'$, as depicted in FIG. 5(D). Thereafter, the L-voltage level end signal is derived until the duration comparator 7-2 detects the start of another spoken phrase.

In response to the H-voltage level speech instruction start signal from the duration comparator 7-2, the controller 5 derives a command signal to activate a group of bandpass filters 8 and other sections in order to recognize the spoken phrase instruction signal derived from the spectrum-normalizing amplifier 6 as a correctly spoken instruction.

FIG. 6 is a block diagram of a second embodiment of the voice detecting means of the speech recognition system according to the present invention.

In this embodiment, the voice detector 7 including the voltage level comparator 7-1 and the pulse duration comparator 7-2, the second smoother 20, and the DC amplifier 21 are all incorporated within a microcomputer 200 provided with an analog-to-digital converter, a central processing unit, a read-only memory, a random-access memory, and input/output interfaces, et cetera. That is to say, some of the functions of the voice detecting means are implemented via arithmetic operations executed in accordance with appropriate software, in place of hardware.

Further, in this embodiment, various elements or sections such as parameter extraction section 9, the memory 10, the reference pattern memory 11, the resemblance comparator 12, the resemblance determination section 13, the controller 5, et cetera are all incorporated within the microcomputer 200 which performs the same functions as those of the above-mentioned discrete elements or sections in accordance with appropriate programs stored therein.

In FIG. 6, a spoken instruction signal including noise transduced via the microphone 2 is first amplified by the spectrum-normalizing amplifier 6. The amplified spoken instruction signal is then applied in parallel to the bandpass filters 8 for a time/power spectrum analysis and to the smoother 15 including the rectifier 15-1 and the first smoother 15-2 having a time constant of about 20 to 30 ms for smoothing the signal. The smoothed signal is supplied to the microcomputer 200 through an analog-to-digital (A-D) converter provided in the microcomputer 200.

On the basis of the digital signals representative of the amplified, rectified and smoothed spoken instruction signal supplied via the microphone 2, the microcomputer 200 detects the start and end of the spoken instruction.

Figure 7:
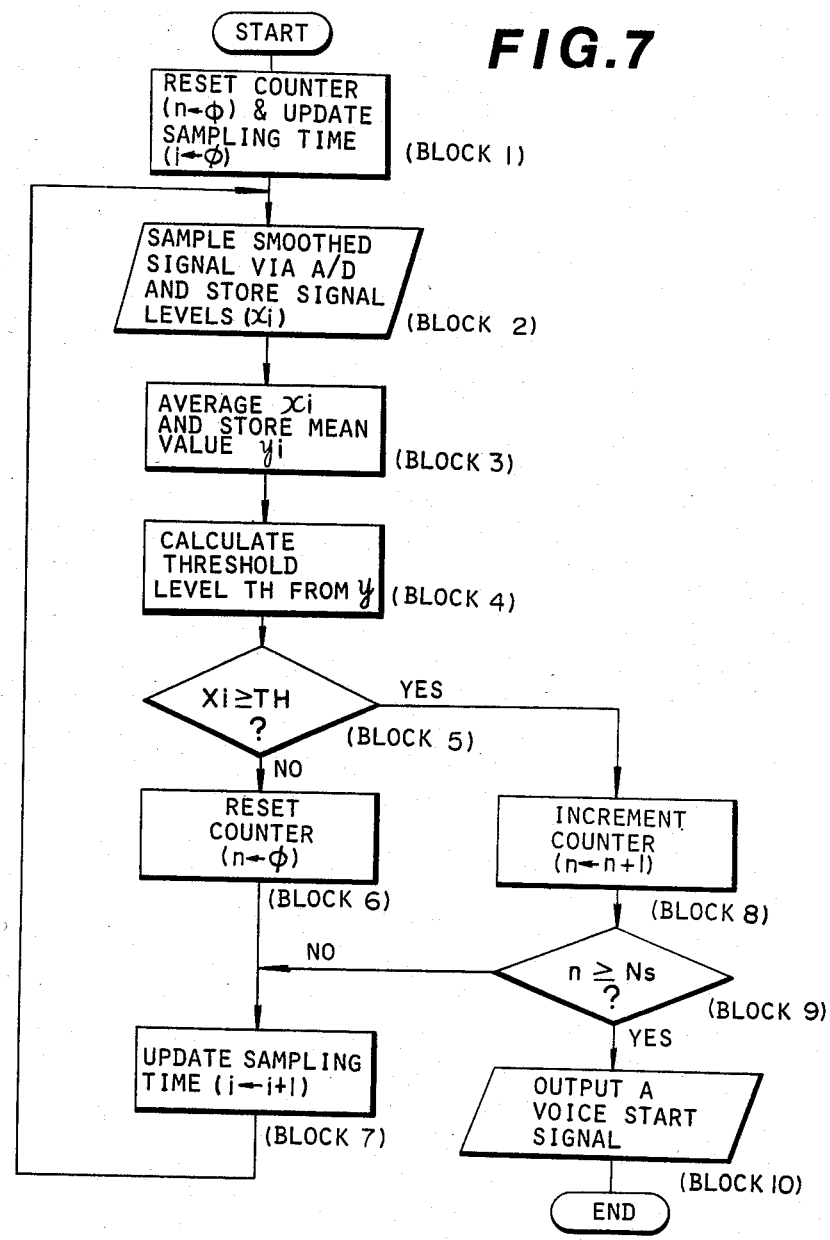
FIG. 7 is a flowchart of the method of detecting the beginning of a spoken instruction signal in accordance with a program stored in a microcomputer shown in FIG. 6.

FIG. 7 is a flowchart of the processing steps of the digital signals from the A-D converter in order to obtain the spoken instruction start signal.

As shown in block 1 of FIG. 7, program control first resets a counter for the time interval during which a spoken instruction signal derived from the first smoother 15-2 exceeds the predetermined reference threshold voltage-level and updates the sampling start time i. In this case, the time interval between (i) and (i+1) is a first sampling time $T_1$ of approximately from 10 to 30 ms. Next, the program starts sampling the analog spoken instruction signal through the A-D converter; that is, the analog spoken instruction signal is converted into the corresponding digital signals after every first predetermined sampling period T and the sampled digital signal levels $x_i$ are stored in the random access memory (in block 2). Thirdly, the program averages the stored, sampled digital signals on the basis of, for instance, the following calculations (in block 3):

$$y_i = \frac{1}{q-p+1} \sum_{k=p}^{q} x(i-k) \tag{1}$$

where $y_i$ indicates the mean value over the time interval from $i-p$ to $i-q$, where p and q are fixed time periods, as depicted in FIG. 8, or $$y_i = (1-r)y_{(i-1)} + rx_i \quad 0 < r < 0.1 \tag{2}$$

where $y_{i-1}$ denotes the preceding mean value and r denotes an averaging constant between 0 and 1. By this expression, the preceding mean value $y_{i-1}$ is corrected on the basis of the current signal level $x_i$ as also depicted in FIG. 8. Fourthly, on the basis of the current average signal level $y_i$, the reference threshold voltage level TH is calculated, for instance, by (in block 4):

$$TH = \alpha y_i + \beta$$

where $\alpha$ is a constant of from 1 to 3 and $\beta$ is also constant. Fifthly, the original signal level $x_i$ is compared with the calculated threshold level TH (in block 5). If $x_i$ is less than TH, then the program resets the counter (in block 6), updates the sampling time i (in block 7), and returns to block 2. If $x_i$ is greater than TH, the counter is incremented ($n \rightarrow n+1$) (in block 8). Sixthly, the counted value n is compared with a predetermined reference number $N_s$ which can be obtained by dividing the reference speech instruction start duration $t_s'$ by the sampling time T ($N_s = t_s'/T$) (in block 9). If n is smaller than $N_s$, the program updates the sampling time i (in block 7) and returns to block 2. If n is greater than $N_s$, a spoken instruction start signal is derived (in block 10) to initiate comparison and recognition of the spoken phrase instruction.

As explained above, the above flowchart performs the same functions achieved by the second smoother (100–2000 ms) 20, the DC amplifier 21, the voltage level comparator 7-1 and the pulse duration comparator 7-2.

FIG. 7 is only the flowchart used to obtain the spoken instruction start signal; however, almost the same flowchart may be used to obtain the spoken instruction end signal, by changing only the blocks 5 and 9. In the case of the end signal, if $x_i$ is less than TH, the counter is incremented in block 5 and the reference number $N_s$ is replaced with a reference number $N_e$ which can be obtained by dividing the reference speech instruction end duration $t_e'$ by the sampling time T ($N_e = t_e'/T$) in block 9.

Figure 9:
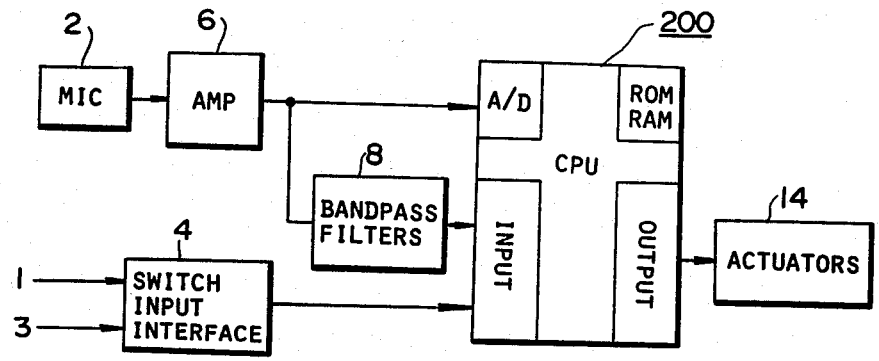
FIG. 9 is a schematic block diagram of a third embodiment of a voice detecting means of the speech recognition system for an automotive vehicle according to the present invention, in which a microcomputer is used.

FIG. 9 is a block diagram of a third embodiment of the voice detecting means of the speech recognition system according to the present invention.

In this embodiment, the functions performed by smoother 15 including the rectifier 15-1 and the first smoother 15-2, the voice detector 7 including the voltage level comparator 7-1 and the pulse duration comparator 7-2, the second smoother 20, and the DC amplifier 21 are all performed by a microcomputer 200. That is to say, all of the functions of the voice detecting means are implemented via the arithmetic operations executed in accordance with appropriate software, in place of hardware.

In addition, in this embodiment, various elements or sections necessary for the speech recognizer 100 are all incorporated within the microcomputer 200, which performs the same functions as those of the discrete elements or sections in accordance with appropriate programs stored therein.

In FIG. 9, a spoken instruction signal including noise transduced via the microphone 2 is first amplified by the spectrum-normalizing amplifier 6. The amplifier spoken instruction signal is then applied in parallel to the bandpass filters 8 for time/power spectrum analysis and to the microcomputer 200 via the analog-to-digital (A-D) converter, provided in the microcomputer 200.

On the basis of the digital signals representative of the amplified spoken instruction signal transduced via the microphone 2, the microcomputer 200 can detect the start or end of the spoken instruction.

Figure 10:
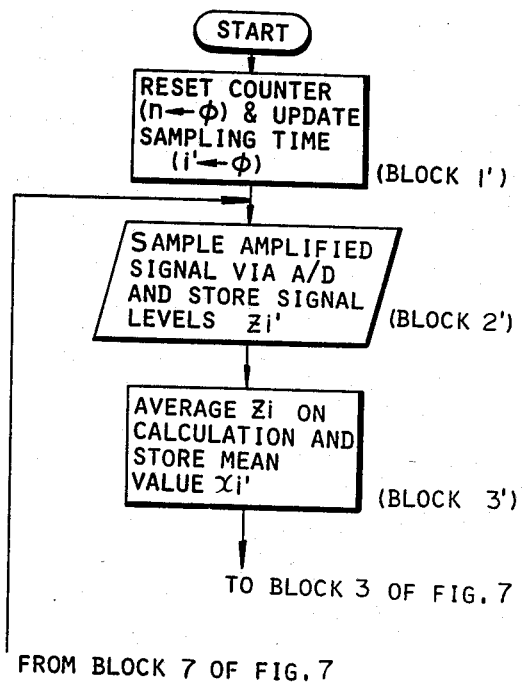
FIG. 10 is a flowchart of the method of detecting the beginning of a spoken instruction signal in accordance with a program stored in a microcomputer shown in FIG. 9.

FIG. 10 is a flowchart of the processing steps for the digital signals from the A-D converter used to obtain the spoken instruction start signal.

In FIG. 10, program control first: (a) resets a counter for the time interval during which a spoken instruction signal derived from the spectrum-normalizinq amplifier 6 and smoothed by the following calculation exceeds the predetermined reference threshold voltage level and (b) updates the sampling start time i' (in block 1'). In this case, the time interval between (i') and (i'+1) is a second sampling time $T_2$ of approximately 0.1 to 0.2 ms.

In the analog circuits, the time constant of the first smoother is from 20 to 30 ms and that of the second smoother is from 100 to 2000 ms; however, in this digital circuits, the sampling time of the first smoothing calculations (corresponding to the time constant of the first smoother 15-2) is approximately from 0.1 to 0.2 ms; the time constant of the second smoothing calculations (corresponding to the time constant of the second smoother 20) is 10 to 30 ms to obtain the sampling speed; it is possible to obtain the same effect as changing the time constant in a hardware smoothing circuit. The faster the sampling speed in digital circuits, the smaller the time constant in analog circuits.

In the second step, the program causes the analog spoken instruction signal to be sampled and converted into the corresponding digital signal during each sampling interval $T_2$ of approximately 0.1 to 0.2 ms. The sampled digital signal levels $Z_{i'}$ are stored in the random access memory (in block 2'). Thirdly, the program averages the stored, sampled digital signals on the basis, for instance, of the following calculations (in block 3'):

$$x_{i'} = \frac{1}{b-a+1} \sum_{k=a}^{b} |Z_{(i'-k)}| \quad (1)$$

where $x_{i'}$ indicates the mean value over the time interval from $i-b$ to $i-a$ in the same way as explained in FIG. 8, or $$x_{i'} = (1-c)x_{(i'-1)} + C \cdot |Z_{i'}|, \quad 0 < C < 0.1 \quad (2)$$

where $x_{(i'-1)}$ is the preceding mean value and c is an averaging constant. In this expression, the preceding mean value $x_{i'-1}$ is corrected on the basis of the current mean value $|Z_{i'}|$. The absolute value form performs the same function as a rectifier 15-1. Because the succeeding steps are the same as those shown in FIG. 7, the description thereof is omitted herein. However, in block 9, since the sampling time $T_2$ of this embodiment is shorter than that of FIG. 7, the values $N_s$ and $N_e$ are derived by dividing the values $t_s$ and $t_e$ by the second sampling time $T_2$.

As described above, in the speech recognition system for an automotive vehicle according to the present invention, since the start and end of a speech instruction can be detected by comparing a rectified and smoothed spoken instruction signal with a reference threshold voltage level which is variable according to the level of noise included in the rectified and smoothed spoken instruction signals derived from a microphone. Even if the ambient noise level within a passenger compartment changes, it is possible to accurately detect the start and end of a spoken instruction, thus preventing erroneous speech instruction detection due to noise; that is, erroneous speech recognition peculiar to a speech recognition system for an automotive vehicle.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A speech recognition system for an automotive vehicle for supplying at least one command signal to at least one vehicle actuator in accordance with a spoken instruction superimposed on background noise, which comprises:
   (a) a microphone for transducing the spoken instruction and background noise into a corresponding electric signal and deriving a first signal corresponding thereto;
   (b) a rectifier connected to said microphone for rectifying the spoken instruction and background noise signal transduced by said microphone and deriving a second signal corresponding thereto;
   (c) a first smoother connected to said rectifier for smoothing the second signal derived by said rectified and deriving a third signal corresponding thereto;
   (d) bandpass filters connected to said microphone for filtering the first signal transduced via said microphone into plural predetermined frequency bands and deriving plural fourth signals corresponding thereto; and
   (e) a microcomputer including an analog-to-digital converter, a central processing unit, a read-only memory, a random-access memory, an input interface, and an output interface, said analog-to-digital converter being connected to said first smoother to be responsive to the third signal, said input interface being connected to said bandpass filters to be responsive to said plural fourth signals, and said output interface being connected to drive said at least one vehicle actuator, said microcomputer responding to the plural fourth signals to store signals representing reference spoken instructions for the actuators, said microcomputer detecting the start and end of the electric signal of the spoken instruction by comparing a first digital signal representing the third signal as derived from said analog-to-digital converter with a second digital signal representing a variable threshold level derived by the microcomputer further smoothing the smoothed spoken instruction signal on the basis of calculations performed by the microcomputer, the first digital signal representing the spoken instruction and the background noise, the smoothing by the microcomputer of the first digital signal causing the second digital signal to represent the background noise to the exclusion of the spoken instruction, the microcomputer deriving a spoken instruction start signal in response to a calculation performed thereby indicating the value represented by the first digital signal first exceeding the value represented by the second digital signal for more than a first predetermined period of time, the microcomputer deriving a speeck instruction end signal in response to a calculation performed thereby indicating the value represented by the first digital signal first dropping below the value represented by the second digital signal for more than a second predetermined period of time, said microcomputer responding to said spoken instruction start and end signals for supplying a command signal corresponding to the spoken instruction transduced by said microphone to one of the actuators in response to said microcomputer determining the transduced spoken instruction to be one of the reference spoken instruction previously stored therein.

2. A speech recognition system for an automotive vehicle for supplying at least one command signal to at least one vehicle actuator in accordance with a spoken instruction superimposed on background noise, which comprises:
 (a) a microphone for transducing the spoken instruction and background noise into a corresponding electric signal and deriving a first signal corresponding thereto;
 (b) bandpass filters connected to said microphone for filtering the spoken instruction signal transduced by said microphone into plural predetermined frequency bands and deriving plural second signals corresponding thereto; and
 (c) a microcomputer including: an analog-to-digital converter, a central processing unit, a read-only memory, a random-access memory, an input interface, and an output interface, said analog-to-digital converter being connected to respond to the first signal as transduced by said microphone, said input interface being connected to said bandpass filters, and said output interface being connected to said at least one vehicle actuator, said microcomputer responding to signals derived from the bandpass filters to store signals representing reference spoken instructions for the actuators, said microcomputer: (a) detecting the start and end of the electric signal of the spoken instruction by converting the spoken instruction signal transduced by said microphone into a first digital signal representing a single polarity, smoothed version of said first signal on the basis of calculations performed by the microcomputer, and (b) comparing the magnitude represented by the first digital signal with a threshold level representing second digital signal obtained by further smoothing the first digital signal on the basis of calculations performed by the microcomputer, and (c) deriving: (i) a spoken instruction start signal in response to the magnitude represented by the first digital signal first exceeding the magnitude represented by the second digital signal reference threshold for more than a first predetermined period of time, and (ii) a speech instruction end signal in response to the magnitude represented by the first digital signal first dropping below the magnitude represented by the second digital signal for more than a second predetermined period of time, said microcomputer responding to the spoken instruction start and end signals for supplying a command signal corresponding to the spoken instruction transduced by said microphone to one of the actuators in response to said microcomputer determining the transduced spoken instruction to be a reference spoken instruction previously stored therein.

3. In a speech recognition system for an automotive vehicle including a microcomputer for supplying at least one command signal to at least one vehicle actuator in accordance with a spoken instruction uttered in a relatively high background noise environment, the spoken instruction and noise being transduced via a microphone, the method of detecting the start of the spoken instruction, which comprises activating the microcomputer to perform the steps of:
 (a) resetting a counter of the microcomputer used to count the time interval during which the spoken instruction signal and the noise transduced by the microphone exceed a predetermined variable reference threshold level and updating a sampling start time i';
 (b) sampling the spoken instruction signal level and the noise transduced by the microphone at a rate not less than once per predetermined second sampling time T2 and converting the sampled signal levels and the noise into corresponding digital levels $Z_i$';
 (c) storing the sampled, converted spoken instruction signal digital levels $Z_i$, in a memory unit;
 (d) converting the stored spoken instruction signal levels $Z_i$ into a digital signal representing single polarity averaged spoken instruction signal levels $x_i$';
 (e) storing the signal levels $x_i$' in the memory unit;
 (f) sampling the spoken instruction signal levels $x_i$' every predetermined first sampling time $T_1$, $T_1$ being much longer than the second sampling time $T_2$;
 (g) storing the sampled spoken instruction signal levels $x_i$ in a memory unit;
 (h) averaging the spoken instruction signal levels $x_i$ to produce a noise background representing signal $Y_i$;
 (i) storing the background signal $Y_i$ in the memory unit;

(j) calculating the current reference threshold level TH on the basis of the background signal $Y_i$; the averaging of steps (d) and (h) being such that the levels $x_i$ represent much higher frequency components than the frequency components in the variable background value $Y_i$; the averaging of step (h) being such that the background value $Y_i$ and threshold value TH are proportional to the noise;

(k) storing the calculated reference threshold level TH in the memory unit;

(l) comparing the spoken instruction signal level $x_i$ with the calculated reference threshold level TH;

(m) resetting the counter if the spoken instruction signal level $x_i$ is lower than the reference threshold TH;

(n) updating the sampling start time and returning to step (b);

(o) incrementing the counter if the spoken instruction signal level $x_i$, is higher than the reference threshold level TH;

(p) comparing the counted value n in the counter with a reference number $N_s$ obtained by the microcomputer dividing a reference speech instruction start duration $t_s'$ by the second sampling time $T_2$;

(q) updating the sampling start time and returning to step (b) if the counted value n is smaller than the reference number $N_s$; and (r) deriving a voice start signal if the counted value n is larger than the reference number $N_s$.

4. In a speech recognition system for an automotive vehicle including a microcomputer for supplying at least one command signal to at least one vehicle actuator in accordance with a spoken instruction transduced via a microphone, the method of detecting the start of the spoken instruction as set forth in claim 3, wherein the first predetermined sampling time $T_1$ is about 10 to 30 milliseconds.

5. In a speech recognition system for an automotive vehicle including a microcomputer for supplying at least one command signal to at least one vehicle actuator in accordance with a spoken instruction transduced via a microphone, the method of detecting the start of the spoken instruction as set forth in claim 3, wherein the second predetermined sampling time $T_2$ is about 100 to 200 microseconds.

6. In a speech recognition system for an automotive vehicle including a microcomputer for supplying at least one command signal to at least one vehicle actuator in accordance with a spoken instruction transduced via a microphone, the method of detecting the start of the spoken instruction as set forth in claim 3, wherein the calculating expression for rectifying and smoothing the spoken instruction signal is $$x_i = \frac{1}{b-a+1} \sum_{k=a}^{b} |Z(i-k)|$$

where a and b denote the times between which a mean value $x_i$ can be obtained.

7. In a speech recognition system for an automotive vehicle including a microcomputer for supplying at least one command signal to at least one vehicle actuator in accordance with a spoken instruction transduced via a microphone, the method of detecting the start of the spoken instruction as set forth in claim 3, wherein the calculating expression for rectifying and smoothing the spoken instruction signal is $$x_i = (1-c)x_{(i-1)} + c|Z_i|$$

where c is a constant greater than zero but smaller than 0.1.

8. In a speech recognition system for an automotive vehicle including a microcomputer for supplying at least one command signal to at least one vehicle actuator in accordance with a spoken instruction transduced via a microphone, the method of detecting the start of the spoken instruction as set forth in claim 3, wherein the calculating expression for obtaining the reference threshold level is $$TH = \alpha Y_i + \beta$$

where $\alpha$ and $\beta$ are constant.

9. In a speech recognition system for an automotive vehicle including a microcomputer for supplying at least one command signal to at least one vehicle actuator in accordance with a spoken instruction uttered in a relatively high background noise environment, the spoken instruction and noise being transduced via a microphone, the method of detecting the start and end of the spoken instruction which comprises the steps of activating the computer to:

(a) sample the amplitude level $Z_i$ of the spoken instruction and noise as transduced by the microphone at a rate not less than once per second sampling time $T_2$;

(b) average the values $Z_i$ over a time scale of the second sampling time $T_2$ to produce spoken instruction signal and noise levels $x_i$;

(c) average the spoken instruction signal and noise levels $x_i$ over a time scale of a first sampling time $T_1$ to produce a variable background value $Y_i$;

(d) increase the variable background value $Y_i$ to a fixed degree to produce a variable threshold value TH; the averaging of steps (b) and (c) being such that the levels $x_i$ represent much higher frequency components than the frequency components in the variable background value $Y_i$; the averaging of step (c) being such that the background value $Y_i$ and threshold value TH are proportional to the noise;

(e) compare the current spoken instruction signal and noise levels $x_i$ with the variable threshold value TH and derive a high signal when the signal and noise levels $x_i$ exceed the variable threshold value;

(f) derive a spoken instruction start signal when the high signal is derived for a continuous length of time greater than a first predetermined duration $t_s$; and (g) derive a spoken instruction end signal when the high signal is absent for a continuous length of time greater than a second predetermined duration $t_e$.

10. A system for enabling an actuator in response to a voice command originating in an environment subject to variable acoustic noise conditions comprising a memory for storing a signal representative of the voice command as previously derived, means for deriving a signal indicative of the presence of a voice signal in the variable noise conditions, and comparison means for energizing the actuator in response to the stored voice command signal correlating with the voice signal as derived during the variable noise conditions, the means for deriving the signal indicative of the presence of a voice signal in the variable noise conditions including: an acoustic wave transducer for deriving a first signal indicative of the voice signal and the noise in the variable noise condition environment, means having a first response time connected to respond to the transducer for deriving a second signal indicative of single polarity smoothed audio frequency variations of the first signal, means having a second response time connected to respond to the transducer and to be responsive to the first signal for deriving a third signal having a variable amplitude indicative of the noise level in the environment, the first response time being considerably faster than the second response time so that the second signal includes much higher frequency components than the third signal, means connected to be responsive to the second and third signals for comparing the second and third signals for deriving a fourth signal having a first value in response to the second signal having an amplitude in excess of the third signal and a second value in response to the third signal having an amplitude in excess of the second signal, means for deriving a speech instruction start signal in response to the fourth signal having the first value for at least a first duration and for deriving a speech instruction end signal in response to the fourth signal having the second value for at least a second duration, whereby the signal indicative of the presence of the voice signal is derived only during the interval between derivation of the speech instruction start and end signals; and means for enabling the comparison means to be responsive to the stored signal in the memory and the voice signal only while the signal indicative of the presence of the voice signal is derived.

11. A system for activating an automotive vehicle actuator in response to a voice command signal coupled to a microphone in a variable noise background, comprising:
(a) a speech recognizer for responding to a signal transduced by the microphone to determine if the transduced signal corresponds with a stored signal indicative of the voice command;
(b) means for responding to the signal transduced by the microphone to determine if the transduced signal is a voice signal in the variable noise background, said voice signal determining means deriving (i) a speech instruction start signal in response to a first smoothed version of the transduced signal exceeding, for at least a first predetermined time interval, a variable threshold level determined by the level of noise in the transduced signal, the level of noise being determined from a second smoothed version of the transduced signal, the first smoothed version of the transduced signal including a frequencies of the transduced signal that are much greater than frequencies of the second smoothed verion, and (ii) a speech instruction end signal in response to the first smoothed version of the first signal first dropping below the variable threshold level for more than a second predetermined time interval;
(c) means for activating the speech recognizer only during the interval between derivation of the speech instruction start and stop signals so that at other times the speech recognizer does not determine if the transduced signal corresponds with a stored signal; and
(d) means responsive to the speech recognizer determining that the signal transduced by the microphone corresponds with a stored signal for enabling the actuator to be activated.

12. The system of claim 11 wherein the means of subparagraph (b) comprises:
(a) a rectifier connected to said microphone for rectifying the signal transduced by said microphone;
(b) a first smoother connected to said rectifier for smoothing the signal rectified by said rectifier and deriving a signal commensurate with the first smoothed version;
(c) a second smoother connected to said rectifier and in parallel with said first smoother for smoothing the spoken instruction signal rectified by said rectifier and deriving the variable threshold level, said second smoother having a time constant much greater than a time constant of said first smoother;
(d) a level comparator having one input terminal connected to said first smoother and another input terminal connected to said second smoother for comparing the level of the first smoothed version as derived from said first smoother with the variable reference threshold level as derived from said second smoother and deriving a H level signal in response to the level of the first smoothed version from said first smoother exceeding the variable reference threshold level and deriving a L level signal in response to the level of the first smoothed version from said first smoother being less than the reference threshold level; and
(e) a pulse duration comparator connected to said level comparator for comparing the duration of the H level signal from said level comparator with an indication of the first predetermined period of time and the duration of the L level signal from said level comparator with an indication of the second predetermined period of time and deriving: (a) the spoken instruction start signal for said speech recognizer in response to the duration of the H level signal from said level comparator exceeding the first predetermined period of time and (b) a spoken instruction end signal for said speech recognizer in response to the duration of the L level signal from said level comparator exceeding the second predetermined period of time.

13. The system of claim 12 wherein the time constant of said first smoother is from 20 to 30 milliseconds.

14. The system of claim 12 wherein the time constant of said second smoother is from 100 to 2000 milliseconds.

15. The system of claim 12 which further comprises a DC amplifier connected between said second smoother and said voltage level comparator, the gain factor thereof ranging from one to four.

16. The system of claim 12 wherein the first predetermined period of time for determining the spoken instruction start is about 150 milliseconds.

17. The system of claim 12 wherein the second predetermined period of time for determining the spoken instruction end is about 300 milliseconds.

* * * * *